United States Patent
Russell et al.

(10) Patent No.: US 6,259,518 B1
(45) Date of Patent: Jul. 10, 2001

(54) WETCELL DEVICE FOR INSPECTION

(75) Inventors: Todd Aldridge Russell, Lawrenceville; Shiao-Tsing David Chiang, Roswell, both of GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/371,753

(22) Filed: Aug. 10, 1999

(51) Int. Cl.$^7$ .................................................. G01B 9/00
(52) U.S. Cl. ................................................ 356/124; 356/244
(58) Field of Search ................................ 356/124–127, 356/239.1, 239.2, 244, 246; 206/5.1, 471, 564

(56) References Cited

U.S. PATENT DOCUMENTS

| | | | |
|---|---|---|---|
| 5,173,738 | * 12/1992 | Bieri | 356/124 |
| 5,443,152 | * 8/1995 | Davis | 206/5.1 |
| 5,467,868 | 11/1995 | Abrams et al. | 206/5.1 |
| 5,500,732 | * 3/1996 | Ebel et al. | 356/124 |
| 5,574,554 | 11/1996 | Su et al. | 356/124 |
| 5,578,331 | * 11/1996 | Martin et al. | 356/239.2 |
| 5,633,504 | * 5/1997 | Collins et al. | 250/461.1 |

FOREIGN PATENT DOCUMENTS

| | | |
|---|---|---|
| 0 491 663 B1 | 12/1991 | (EP) . |
| 2057832 | 12/1991 | (CA) . |
| 0 686 841 A2 | 6/1995 | (EP) . |

* cited by examiner

*Primary Examiner*—Hoa Q. Pham
(74) *Attorney, Agent, or Firm*—R. Scott Meece; Richard I. Gearhart

(57) ABSTRACT

The invention provides an inspection cell for inspecting an ophthalmic lens. The inspection cell is a solid block that has a bottom planar surface, a top surface, and an indentation in the top surface. The indentation is adapted to receive an ophthalmic lens, which is to be inspected. The invention additionally provides an inspection unit for an ophthalmic lens, which holds one or more of the inspection cells.

7 Claims, 2 Drawing Sheets

WETCELL DEVICE FOR INSPECTION

BACKGROUND OF THE INVENTION

The present invention relates to a device that receives an ophthalmic article for an inspection.

Conventional production methods for producing ophthalmic lenses, e.g., contact lenses and intraocular lenses, include lathe cutting methods and cast molding methods. A lathe cutting method produces an ophthalmic lens by cutting a solid substrate of a polymeric optical material to a designed shape. A cast molding method uses a molding process to produce an ophthalmic lens. Typically, a lens mold having two mold halves, i.e., a front curve mold half and a back curve mold half, is used to mold a lens from a polymerizable liquid composition. Once the lens is produced and before it is packaged, the lens is inspected for flaws and damages that may be created or included during the production process.

Typically, a finished lens is inspected before the lens is packaged for sale. The inspection process for ophthalmic lenses, especially hydrogel lenses, e.g., polyhydroxyethylmethacrylate contact lenses, is highly arduous since a typical ophthalmic lens is transparent, and therefore, it is difficult to locate the lens, let alone inspect the lens, especially when the lens is placed in a transparent liquid, such as water or saline solution. A conventional process for inspecting a hydrogel lens is a manual process that places the lens in a Petri dish and visually inspects the lens under a magnifying projection device. A human inspector must place the lens in a Petri dish under a magnifying projection device and locate the lens in the dish before the inspector can begin the visual inspection.

As for an automated machine vision inspection system, a lens is placed in a cell and then the cell is placed under a CCD camera to take a digital image of the lens. The digital image is analyzed with a microprocessor to detect defects in the lens. For example, U.S. Pat. No. 5,443,152 discloses an automated inspection system for a contact lens that uses an inspection cell. The patent teaches a disposable conical cell for transporting and inspecting a contact lens. Although the conical inspection cell is useful, the conical shape of the inspection cell highly or nonuniformly distorts the inspection light as the light passes through various sections of the cell.

There remains a need for an inspection cell that ensures predictable placement of a lens placed therein and does not highly and nonuniformly distort inspection light, thereby allowing a simple inspection system to be used to inspect the lens.

SUMMARY OF THE INVENTION

There is provided in accordance with the present invention an inspection cell, more particularly an inspection wetcell, suitable for inspecting an ophthalmic lens, e.g., a contact lens. The inspection cell is a solid block that has a bottom planar surface, a top surface, and an indentation in the top surface. The indentation is adapted to receive an ophthalmic lens and to place the lens in the center of the viewing field. The invention additionally provides an inspection unit for an ophthalmic lens. The inspection unit holds one or more of the inspection cells.

The inspection cell of the present invention allows an opthalmic lens to settle to the bottom of the indentation of the inspection cell and allows light to transmit through the cell without significant optical distortion once a carrier liquid is placed in the indentation. Accordingly, the inspection cell is highly suitable for conducting an automated or a manual inspection of an ophthalmic lens with a relatively simple inspection system.

DETAILED DESCRIPTION OF THE INVENTION

The present invention provides an inspection cell for inspecting an ophthalmic lens, especially a hydrogel ophthalmic lens. The inspection cell is a block of a transparent or translucent solid material, and the block has a concave indentation in the upper surface such that an ophthalmic lens can be placed in the indentation. The indentation of the cell has a dimension that ensures the ophthalmic lens placed therein descends to and settles at or around the center or apex of the indentation when the indentation is filled with appropriate fluid. According to the present invention, an ophthalmic lens placed in the inspection cell is inspected for flaws, e.g., tears and flash, and inclusions of extraneous materials, e.g., air bubbles, using a manual or machine vision inspection system.

Figure 1:
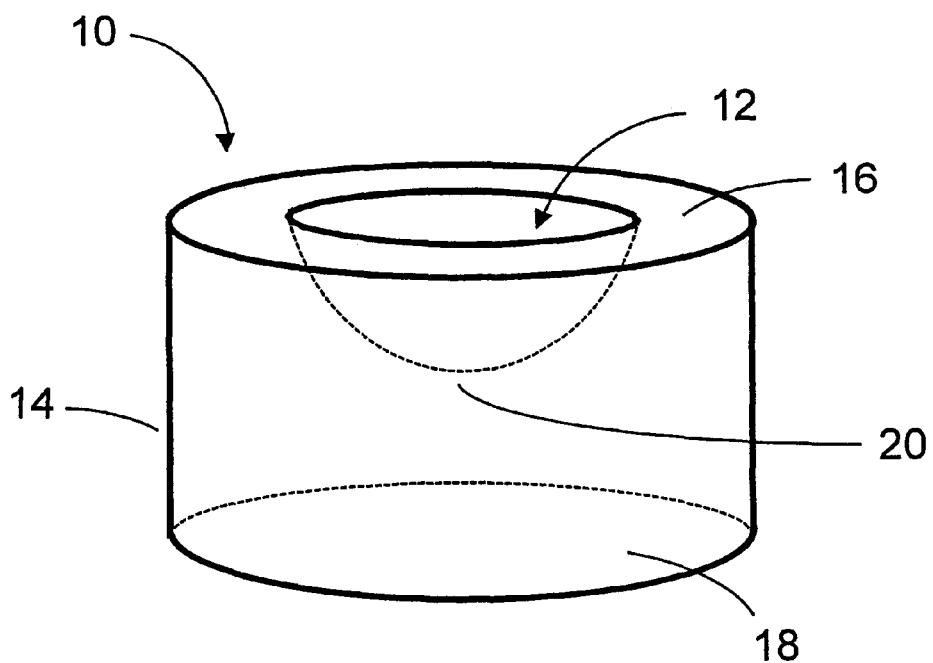
FIG. 1 illustrates an exemplary inspection cell of the present invention.

FIG. 1 illustrates an exemplary inspection cell of the present invention. Although FIG. 1 illustrates the present invention in conjunction with a cylindrical inspection cell for a contact lens, the inspection cell can have other side wall configurations and base shapes, e.g., cubical, and other ophthalmic lenses, e.g., interocular lens, can be inspected in the cell. The inspection cell 10 has a concave indentation 12, which is adapted to receive and hold an ophthalmic lens, especially a contact lens. The inspection cell 10 has a cylindrical sidewall 14, an upper planar surface 16 and a lower planar surface 18. Preferably, the upper planar surface 16 and the lower planar surface 18 are parallel to each other, and the lower planar surface 18 and the surface of the concave indentation are optically finished, i.e., highly polished, such that imperfections on these surfaces do not randomly scatter light and do not interfere with the inspection process. The suitable level of optical finish has scratch and dig values preferably up to 40/20, more preferably up to 20/10, in accordance with the U.S. Military Specification for the inspection of Optical Components, MIL-O-13830A.

As for the concave indentation 12, it has a shape that allows a contact lens to easily and reliably settle to or near the apex 20 of the concave indentation 12 when the lens is placed in the opening of the indentation 12. Suitable shapes for the concave indentation 12 include hemispherical, hemielliptical and bowl shapes. A suitable indentation can also have a combination of shapes, such as a frustoconical wall with a hemispherical apex. Preferably, a suitable indentation for the present invention has a symmetrical inwardly curved sidewall that forms a smooth converging region at center of the indentation. As a preferred embodiment of the present invention, the concave indentation has a hemispherical shape. The term "hemispherical" as used herein indicates a configuration that is a portion of a sphere, including a half sphere. The hemispherical shape is desirable in that the symmetrical circular shape does not require highly precise positioning and orientation of the indentation when fabricating the inspection cell and using the cell for inspection. For example, even when the two planar surfaces of an inspection cell are not parallel to each other and a hemispherical indentation is formed with respect to the upper surface, the symmetrical configuration of a hemispherical ensures that there is only one apex when the cell is horizontally placed with respect to the lower surface.

To facilitate the settling movement of the contact lens, the radius of the curvature of the concave indentation, especially near the apex 20, should be larger than the radius of the front curve of the contact lens. Preferably, when a hydrogel soft contact lens is inspected in the inspection cell 10, the radius near the apex 20 is at least about 15% larger than the radius of the front curve of the lens. More preferably, the radius near the apex 20 is at least about 20% larger than but less than about 400%, even more preferably at least about 50% larger than but less than about 200%, of the radius of the front curve of the lens. Reliably settling the lens 30 to the apex 20 within a range of tolerance is highly useful for the inspection process since the location of the lens 30 in the inspection cell 10 becomes predictable.

Figure 2:
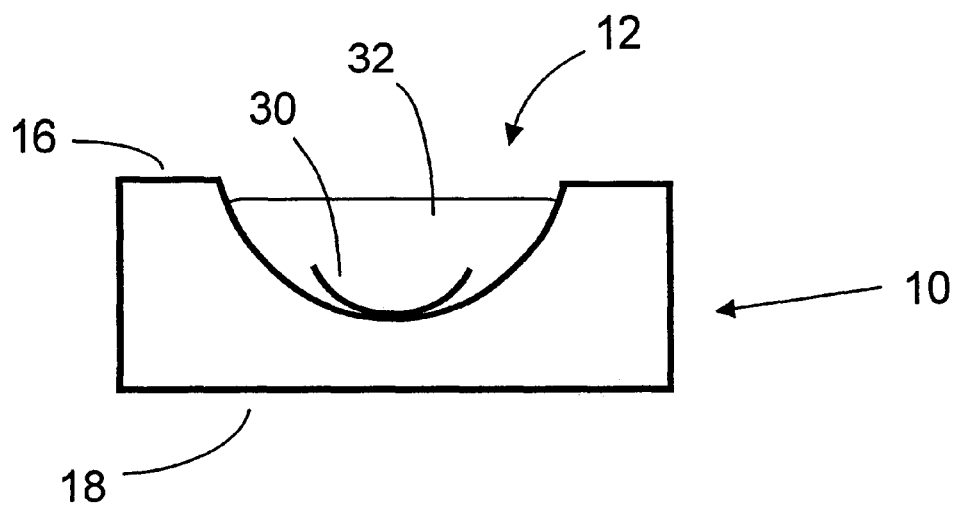
FIG. 2 illustrates a cutaway side view of an inspection cell.

According to the present invention, the size or volume of the concave indentation 12 should be large enough to completely contain the contact lens placed therein. More specifically, the concave indentation 12 should be large enough to hold an amount of a carrier liquid, e.g., water or a saline solution, such that the contact lens is completely submerged in the liquid. Preferably, the overall volume of the concave indentation 12 is between about 600% and about 100%, more preferably between about 550% and about 200%, most preferably between about 500% and about 300%, larger than the volume of the hemisphere formed by the contact lens. The use of a carrier liquid is important for hydrogel contact lenses since a hydrogel lens by itself does not have sufficient rigidity to retain its natural configuration. The carrier liquid provides support to make the lens self-supportive and allows the lens to exhibit its proper shape, making possible proper inspection of the lens. Additionally, the carrier liquid allows the lens to settle to the apex of the concave indentation 12. FIG. 2 illustrates a cutaway side view of the inspection cell 10 with a contact lens 30 in the concave indentation 12. The lens 30 is submerged in a carrier liquid 32 such that the shape of the lens 30 is not distorted and the lens 30 can be inspected.

Suitable carrier liquids include water, e.g., deionized water, and isotonic solutions that are compatible with the eye, e.g., sodium chloride saline and polysaccharide solutions. The carrier liquid may also contain additives that facilitate the inspection process, provide that the additives do not significantly reduce the clarity of the carrier liquid. For example, the carrier liquid may contain a small amount of a surfactant to facilitate the movement of the lens in the inspection cell and to avoid trapping air bubbles on the lens or the surface of the indentation of the inspection cell.

In accordance with the present invention, the inspection cell is produced from a transparent or translucent material, depending on the type of inspection system used. A transparent or substantially transparent solid material is preferred for the present inspection cell. As a preferred embodiment, the solid material for the inspection cell is transparent and has a transmission efficiency of at least about 80%, preferably at least about 85%, more preferably at least about 90%, most preferably at least about 95%, for visible light.

Suitable materials for the inspection cell include quartz, glass and thermoplastic polymers, and suitable thermoplastics include polycarbonate, polystyrene, polyethylene, polypropylene, polyester, polymethylmethacrylate, methylpentene, nylon and the like, as well as transparent and translucent copolymers thereof. Of these suitable solid materials. thermoplastic materials are preferred, transparent thermoplastic materials are more preferred, if a disposable inspection cell is desired; and quartz is preferred if a reusable inspection cell is desired. As a preferred embodiment of the present invention, a suitable solid material for the inspection cell has an index of refraction or a refractive index that is not highly different from the carrier liquid, e.g., water or a saline solution. Preferably, the difference in the refractive indices between the solid material and the carrier liquid is less than about 20%, more preferably less than about 15%, based on the refractive index of the cell. The similarity in the refractive indices of the inspection cell and the carrier liquid is highly useful since inspection light that transverses the interface between the inspection cell and the carrier liquid is not significantly distorted or refracted when the two materials have similar refractive indices. It is to be noted that the distortion of the path of inspection light caused by the inspection cell can be optically corrected with a system of optical lenses, provided that the distortion is not significant and highly non-uniform. For a reusable inspection cell, quartz is particularly suitable present invention since quartz has a refractive index which is not highly different from the refractive indices of water and isotonic saline solutions and is highly abrasion resistant such that the inspection cell provides undistorted images and can be reused for repeated inspection cycles. In addition, quartz has a hydrophilicity that allows an aqueous liquid to form a flattened meniscus, thereby further preventing distortion of the path of the light.

Returning to FIG. 2, the inspection cell 10 contains the contact lens 12 in a carrier liquid 32, e.g., an isotonic saline solution. When inspection light, which can be scattered light or collimated light depending on the type of the inspection system, is projected through the lower surface 18 of the inspection cell, the light passes through the inspection cell as well as through the contact lens 30 and the carrier liquid 32. The light exiting the carrier solution above the contact lens is then manually observed with a projection magnifier or analyzed with a machine vision system for the presence of any flaws and inclusions in the contact lens. Since the inspection cell 10 and the carrier liquid 32 do not have highly different refractive indices, the path of the light passing entering the carrier liquid 32 from the inspection cell 10 is not highly distorted, i.e., not highly refracted, even though the interface between the two materials forms a concave surface. Alternatively stated, when the lens is placed in the inspection cell 10 without the carrier liquid 32, the image of the contact lens 30 will be significantly distorted since the concave surface of the indentation 12 causes the inspection cell 10 to act as a concave optical lens.

When the carrier liquid is placed in the indentation 20, the inspection cell essentially forms an optical block from the lower planar surface 18 to the top surface of the carrier liquid. Consequently, light passing through the inspection cell and the carrier liquid is not significantly distorted, and the light projected through the inspection cell can be simply analyzed using an automated or manual inspection system. In contrast, typical prior art inspection cells for an automated inspection, for example disclosed in U.S. Pat. No. 5,443,152 to Davis, have a curved outer surface at the apex of the indentation, and therefore, such an inspection cell significantly distorts the path of the light. Accordingly, the light passing through such a prior art inspection cell needs to be optically manipulated to correct the distortion with an elaborate corrective optical system.

Figure 3:
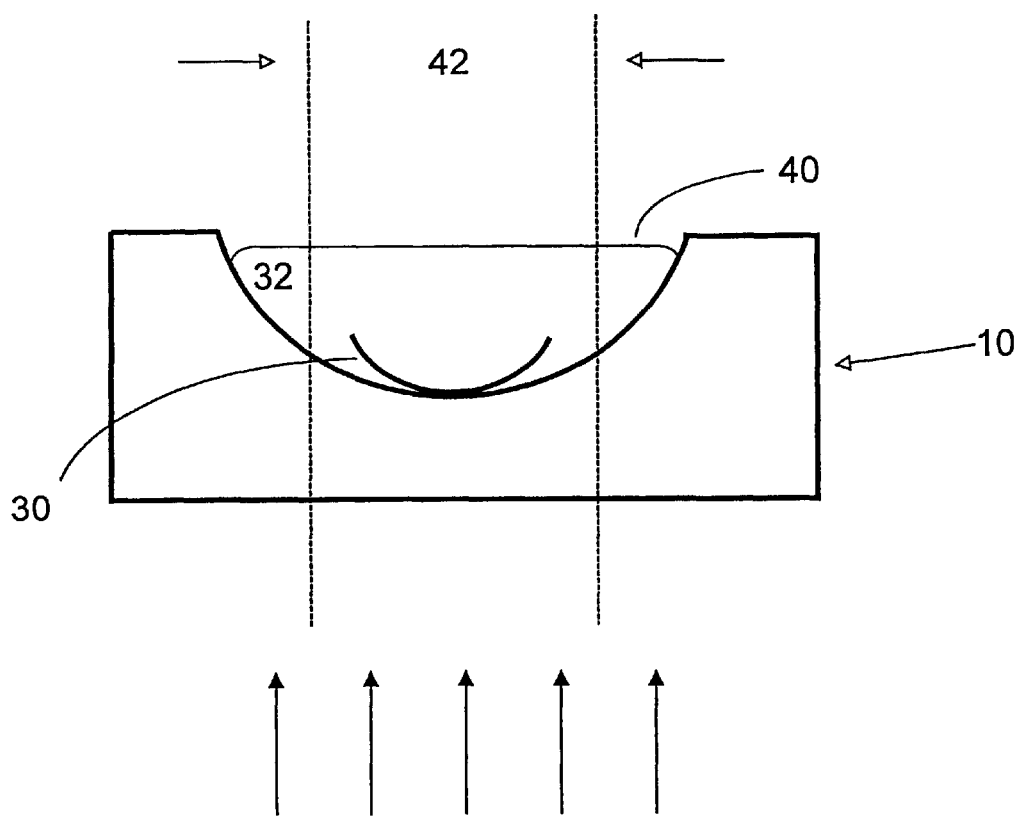
FIG. 3 illustrates the field of inspection for an inspection cell.

It has been found that an uncontrolled formation of the meniscus by the carrier liquid in the inspection cell may interfere with the path of the inspection light. Accordingly, the location of the meniscus, especially the edge of the meniscus, should be controlled, for example, by placing the edge of the meniscus away from the field of inspection. FIG. 3 illustrates an exemplary set up for controlling the meniscus 40 formed by the carrier liquid against the concave surface of the hydrophobic inspection cell 10. The opening of the indentation of the inspection cell 10 in FIG. 3 has a diameter which is larger than the field of inspection 42 such that the bent peripheral edge of the meniscus 40 is located away from the field of inspection 42. When the inspection light 44 passes through the inspection cell 10, the lens 30 and the carrier liquid 32, only the portion of the light that is in the field of inspection 42 is captured by the inspection camera, if an automated inspection system is used, or by the viewing lens, if a manual inspection system is used. Accordingly, by limiting the viewing section over the meniscus or increasing the size of the opening of the indentation, thereby placing the bent edge of the meniscus to be outside of the field of inspection, the image distorting effect of the meniscus can be avoided.

Alternatively, the inspection cell can have an extended wall above the opening of the indentation, e.g., a cylindrical wall, which has a larger diameter than the opening of the indentation. When the carrier liquid is over filled in the indentation, the extra liquid over the opening of the indentation forms a meniscus along the extended wall away from the field of inspection, which is equal to or smaller than the opening of the indentation of the inspection cell.

Figure 4:
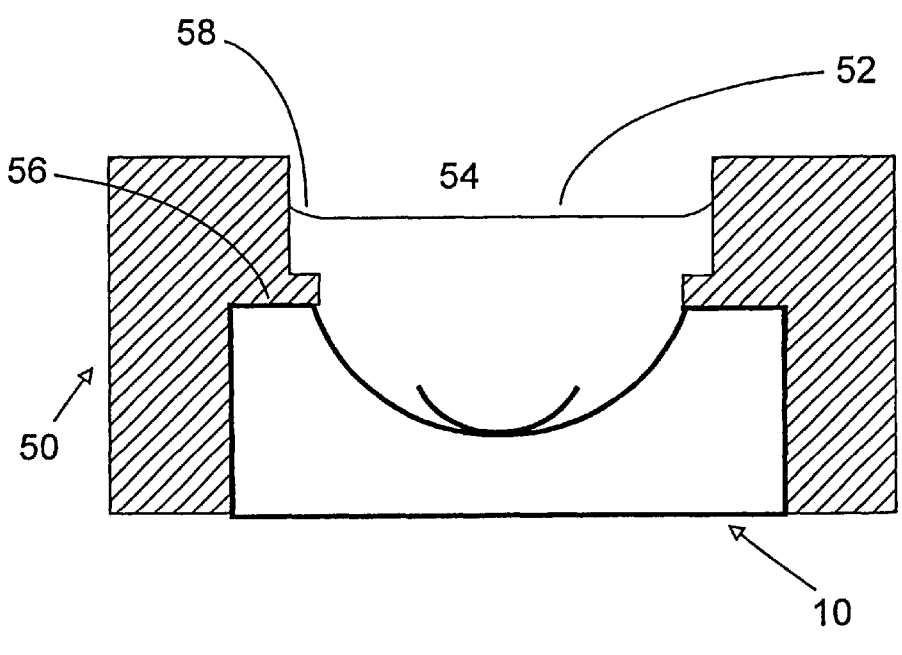
FIG. 4 illustrates an inspection unit having an inspection cell and a carrier.

FIG. 4 illustrates another exemplary set up for controlling the image distorting effect of the meniscus. The inspection cell 10 is placed in a cell carrier 50, forming an inspection unit. The inspection cell 10 retained by the cell carrier 50 by various means, such as friction, constriction, adhesive or thread. The cell carrier 50 has an upper opening 52 and a cylindrical upper void 54. The void and the opening allow inspecting light to pass through the inspection unit without an interruption. The interface 56 between the upper planar surface of the inspection cell and the cell carrier form a tight seal such that the carrier liquid does not leak between the inspection cell 10 and the cell carrier 50. Accordingly to the present invention, the upper opening 52 and the upper void 54 of the carrier are larger than the opening of the indentation of the inspection cell. When an amount of the carrier liquid is placed in the inspection unit to allow the liquid to fill the indentation and some portion of the upper void 54, a meniscus 58 is formed along the wall of the upper void 54. Because the upper void 54 is larger than the opening of the indentation, the bent peripheral edge of the meniscus is located outside of the field of inspection, which is equal to or smaller than the diameter of the opening of the indentation. Optionally, the bottom of the upper void has an extended lip that is extended towards the axis of the upper void cylinder such that the extended lip interrupts or blocks the passage of the light outside the opening of the indentation of the inspection cell. The interruption by the extended lip masks the light from reaching the bent peripheral edge of the meniscus, thereby eliminating the image distorting effect of the meniscus. The extended lip feature of the cell carrier is more effective when the carrier blocks the passage of light, i.e., the extended lip or the whole cell carrier is opaque.

The cell carrier can be fabricated from a variety of solid materials since the carrier only functions as a rigid material that holds one or more of the inspection cells. Suitable materials include various thermoplastic polymers, e.g., polyethylene, polypropylene, polystyrene, polyester, polyamide, acrylic polymers and the like; metals, e.g., aluminum. iron, brass, copper, and the like; thermoset polymers; and the like. Preferably, suitable materials for the cell carrier are opaque or translucent, since such materials provide the above-described masking effect. Additionally, an opaque or translucent material is preferred since the surfaces of the carrier and the interfaces of the carrier and the inspection cell may cause unwanted scattering of light if the carrier is fabricated from a transparent or light-reflecting material. Such unwanted scattering of light may interfere with the proper lighting condition for the inspection cell, e.g., by making the lighting condition uneven, or producing undesirable bright spots and shadows. More preferred materials for the carrier are opaque, e.g., gray or black, and most preferred are black. It is to be noted although the cell carrier is illustrated above in conjunction with a carrier that holds one inspection cell, the cell carrier can be designed to hold more than one inspection cell such that a multitude of inspection cells can be simultaneously conveyed and inspected.

The inspection cell of the present invention is suitable for manual and automated inspection systems. Exemplary suitable automated inspection systems are disclosed in European Patent Application No. 91810978.6, U.S. Pat. No. 5,574,554 and European Patent Application No. 95304003.7.

The inspection cell of the present invention is highly suitable for inspecting an article, especially a transparent or translucent article, suspended or submerged in liquid. The inspection cell of the present invention provides many advantages over prior art inspection cells. For example, the inspection cell allows the article to settle to the apex of the indentation such that the location of the article in the cell is predictable, and the inspection cell does not significantly distort the light passing through the cell when the carrier liquid is placed in the cell. The inspection cell is highly suitable for various inspection systems, especially for machine inspection systems.

The present invention is further illustrated with the following example. However, the example is not to be construed as limiting the invention thereto.

EXAMPLE

A reusable inspection cell is produced from quartz. A cylindrical quartz block, having a diameter of about 22.2 mm and a length of about 8 mm and having two parallel planar surfaces, is ground to have a hemispherical indentation of an about 11 mm radius. The apex of the indentation is about 2 mm above the bottom planar surface of the quartz cylinder. The indentation and the lower planar surface of the quartz block are polished to have an optical finish. The resulting inspection netcell exhibits highly uniform optical properties over the indentation and is highly scratch resistant, making the wetcell highly suitable for inspecting hydrogel contact lenses. The indentation is filled with an isotonic sodium chloride saline solution, and a hydrogel contact lens having a diameter of about 14 mm and a front curve radius of about 9 mm is placed in the indentation. The hydrogel lens consistently settles to the center of the indentation, and the high scratch resistance of quartz makes the wetcell highly suitable for many repeated use and wash cycles of the lens inspection process.

What is claimed is:

1. An inspection cell for an ophthalmic lens, comprising a solid block having a bottom planar surface and a top surface, wherein said top surface has a concave indentation, wherein said concave indentation is adapted to accept said ophthalmic lens and wherein said indentation has an apex and said apex has a radius at least about 15% larger than the radius of said ophthalmic lens.

2. The inspection cell of claim 1, wherein said indentation is hemispherical, hemielliptical or conical.

3. The inspection cell of claim 1, wherein said indentation is hemispherical.

4. The inspection cell of claim 1, wherein said bottom planar surface and the surface of said concave indentation are optically finished.

5. The inspection cell of claim 1, wherein said bottom planar surface and the surface of said concave indentation are optically finished, and said inspection cell comprises a transparent material.

6. The inspection cell of claim 5, wherein said transparent material is quartz, glass, polymethylmethacrylate, polycarbonate, polystirene, polyester, methylpentene or nylon.

7. The inspection cell of claim 5, wherein said transparent material is quartz.

* * * * *